US012590834B2

(12) United States Patent　　　　　(10) Patent No.: US 12,590,834 B2
Castillo Castellanos et al.　　　　　(45) Date of Patent: Mar. 31, 2026

(54) MAPPING FIBER NETWORKS

(71) Applicant: Google LLC, Mountain View, CA (US)

(72) Inventors: Jorge Alberto Castillo Castellanos,
Pasadena, CA (US); Valey Kamalov,
Gainesville, FL (US); **Ignatius Sonny
Franslay**, Campbell, CA (US);
Shirshendu Bhattacharya, Singapore
(SG)

(73) Assignee: Google LLC, Mountain View, CA (US)

( * ) Notice: Subject to any disclaimer, the term of this
patent is extended or adjusted under 35
U.S.C. 154(b) by 595 days.

(21) Appl. No.: 17/896,588

(22) Filed: Aug. 26, 2022

(65) Prior Publication Data

US 2024/0094050 A1　　Mar. 21, 2024

(51) Int. Cl.
　　*G01J 1/04*　　　　(2006.01)
　　*G02B 6/44*　　　　(2006.01)

(52) U.S. Cl.
　　CPC .......... *G01J 1/0425* (2013.01); *G02B 6/4432*
　　　　　　　　　　　　　　　　(2013.01)

(58) Field of Classification Search
　　CPC .................................................... G01J 1/0425
　　See application file for complete search history.

(56) References Cited

U.S. PATENT DOCUMENTS 10,650,648 B2　　5/2020　Englund
2012/0226452 A1 *　9/2012　Hill ........................ G01H 9/004
　　　　　　　　　　　　　　　　　　　　702/56

2014/0150563 A1 *　6/2014　Lambert ............. G01M 5/0091
　　　　　　　　　　　　　　　　　　　　29/515
2020/0124735 A1　　4/2020　Huang et al.
2021/0180997 A1　　6/2021　Huang et al.
2024/0302229 A1 *　9/2024　Lindsey ................. G01L 1/242

FOREIGN PATENT DOCUMENTS

EP　　　　3715818 A1　　9/2020

OTHER PUBLICATIONS

Kanga et al., "GIS Based Mapping of Optical Fiber Cable in a Part
of ALWAR District, Rajasthan, India", International Journal of
Recent Technology and Engineering (IJRTE), vol. 8 Issue-2, Jul.
2019, 6 pages.
Simon, "How Underground Fiber Optics Spy on Humans Moving
Above", [online] [retrieved Jun. 16, 2022]. Retrieved from the
Internet: <https://www.wired.com/story/how-underground-fiber-
optics-spy-on-humans-moving-above/.html>, Science, Jun. 28, 2021,
11 pages.

(Continued)

*Primary Examiner* — Hyun D Park
(74) *Attorney, Agent, or Firm* — Lerner David LLP

(57)　　　　　　　ABSTRACT

The technology is generally directed to a method of mapping
fiber networks. The fiber networks may include a plurality of
cables, such as fiber optic cables. The cable may be divided
into segments. Each cable has a first end segment and a
second end segment, each with a known location. When
there is a perturbation that causes the cable to vibrate, each
segment of the cable may experience an associated strain at
a different time. Based on the known location of the pertur-
bation sources, the known location of the end segments, and
the relative time that the perturbation is detected at each
cable segment, the location of each segment and, therefore,
the entire cable may be determined.

20 Claims, 11 Drawing Sheets

(56)                      References Cited

OTHER PUBLICATIONS

Ajo-Franklin et al., "Distributed Acoustic Sensing Using Dark Fiber for Near-Surface Characterization and Broadband Seismic Event Detection", Scientific Reports, Feb. 4, 2019, 14 pages.
International Search Report and Written Opinion for International Application No. PCT/US2023/014875 dated Jul. 7, 2023. 13 pages.

\* cited by examiner

500

555

Server Computing Device(s)

Processor(s) 522

Memory 524

Instructions 526

Data 528

Optoelectronic
Interrogator 420

Processor(s) 422

Memory 424

Instructions 426

Data 428

Laser 430

Output 432

Input 434

Storage
System
560

550

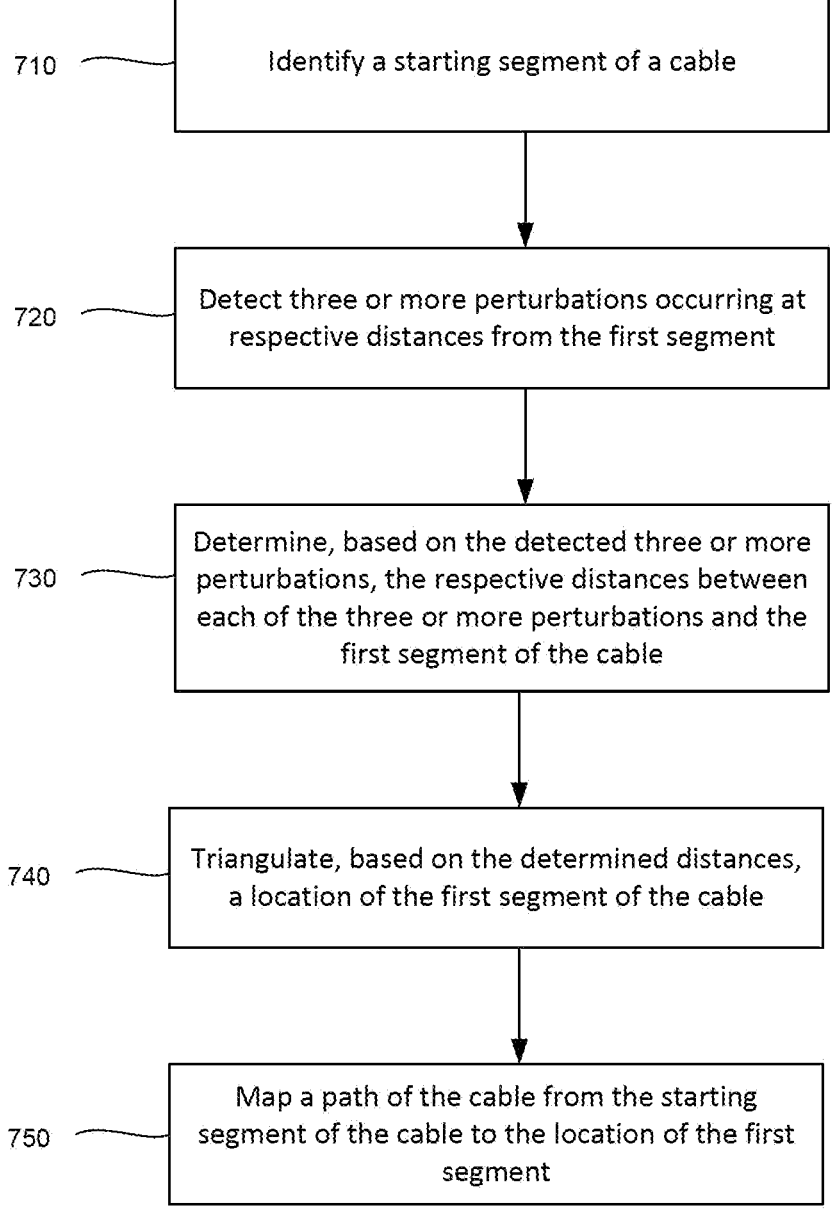

710  Identify a starting segment of a cable

720  Detect three or more perturbations occurring at respective distances from the first segment 730  Determine, based on the detected three or more perturbations, the respective distances between each of the three or more perturbations and the first segment of the cable 740  Triangulate, based on the determined distances, a location of the first segment of the cable 750  Map a path of the cable from the starting segment of the cable to the location of the first segment

FIG. 7

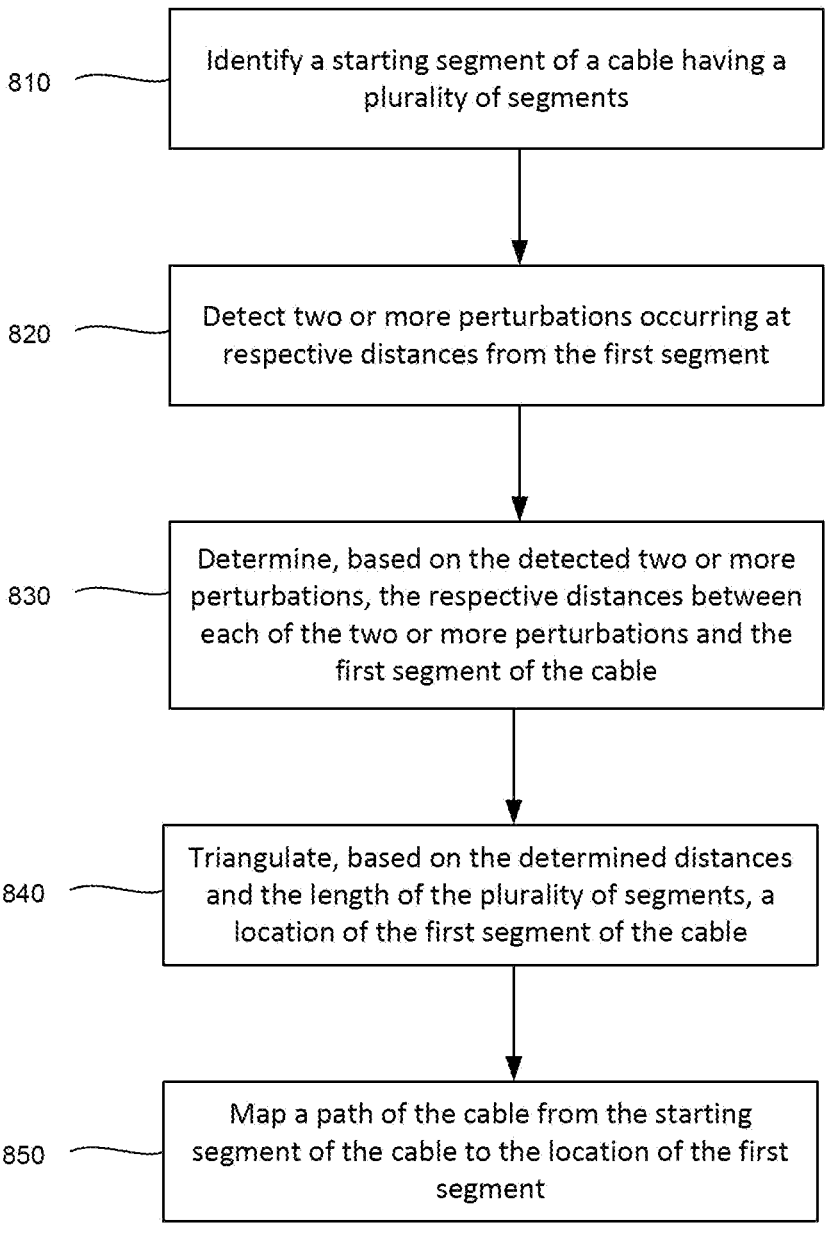

810 — Identify a starting segment of a cable having a plurality of segments

820 — Detect two or more perturbations occurring at respective distances from the first segment 830 — Determine, based on the detected two or more perturbations, the respective distances between each of the two or more perturbations and the first segment of the cable 840 — Triangulate, based on the determined distances and the length of the plurality of segments, a location of the first segment of the cable 850 — Map a path of the cable from the starting segment of the cable to the location of the first segment

FIG. 8

MAPPING FIBER NETWORKS

BACKGROUND

A fiber map may indicate a general location of a cable within a fiber network. The fiber map may be based on original design plans for installation of the fiber network. However, changes in cable routing often occur as a result of repair or rerouting. Such changes are often not reflected in fiber maps, making them outdated and obsolete. To update the mapping of fiber optic networks, users may have to dig up or physically trace the path of the cable. This is laborious, expensive, and time consuming.

The unavailability of accurate cable route maps makes it difficult to repair a cable as it first requires determining the location of the cable and, more specifically, the location of the portion to be repaired. Further, by not having accurate cable route maps, the deployment of future fiber networks is hindered until the location of the current networks is mapped.

BRIEF SUMMARY

The technology is generally directed to a method of mapping fiber networks including a plurality of cables. The starting location of each cable may be known and the remainder of the cable may be divided into segments. The cable may be vibrated by mechanical perturbations, such as earthquakes, environmental noise, etc. Each segment may experience a strain associated with the perturbation at a different time. The location of each segment may be determined based on the known location of perturbation sources, the known location of the starting location of the cable, and the relative time that each perturbation is detected at each cable segment. The location of each segment may be determined by triangulating the distance between three or more of the perturbations and the location of the segment. According to some examples, the location of each segment may be determined by triangulating the distance between two perturbations and the location of the segment within the length of the segments.

One aspect of the technology is a method, comprising identifying, by one or more processors, a starting segment of a cable, detecting at a first segment of the cable, by the one or more processors, three or more perturbations occurring at respective distances from the first segment, determining, by the one or more processors based on the detected three or more perturbations, the respective distances between each of the three or more perturbations and the first segment of the cable, triangulating, by the one or more processors based on the respective distances, a location of the first segment of the cable, and mapping, by one or more processors, a path of the cable from the starting segment of the cable to the location of the first segment of the cable.

Detecting the three or more perturbations may further include determining, by the one or more processors, a respective time of arrival of the perturbation at the first segment for each of the three or more perturbations. Determining the distance between each of the three or more perturbations and the location of the first segment of the cable may comprise determining, by the one or more processors, a velocity of each of the three or more perturbations. The method may further comprise determining at the starting segment of the cable, by the one or more processors, a respective time of arrival of each of the three or more perturbations, determining, by the one or more, a respective distance between the starting segment of the cable and each of the three or more perturbations, and determining, by the one or more processors based on the respective time of arrival of the perturbation at the starting segment of the cable and the respective distance between the starting segment of the cable and each of the three or more perturbations, the velocity of each of the three or more perturbations.

The starting segment of the cable may be at an end segment of the cable and the first segment of the cable is adjacent to the starting segment. The cable may include a plurality of segments.

The method may further comprise detecting at each of the plurality of segments, by the one or more processors, the three or more perturbations occurring at respective distances from each of the plurality of segments, determining, by the one or more processors based on the detected three or more perturbations, the respective distance between each of the three or more perturbations and each the plurality of segments, triangulating, by the one or more processors based on the respective determined distances, a location of each of the plurality of segments, and mapping, by the one or more processors, the path of the cable between each of the plurality of segments.

Another aspect of the technology is a system, comprising one or more processors. The one or more processors may be configured to identify a starting segment of a cable, detect at a first segment of the cable three or more perturbations occurring at respective distances from the first segment, determine, based on the detected three or more perturbations, the respective distance between each of the three or more perturbations and the first segment of the cable, triangulate, based on the determined distances, a location of the first segment of the cable, and map a path of the cable from the starting segment of the cable to the location of the first segment of the cable.

Yet another aspect of the technology is a non-transitory computer-readable medium storing instructions, which when executed by one or more processors, cause the one or more processors to identify a starting segment of a cable, detect at a first segment of the cable three or more perturbations occurring at respective distances from the first segment, determine, based on the detected three or more perturbations, the respective distance between each of the three or more perturbations and the first segment of the cable, triangulate, based on the determined distances, a location of the first segment of the cable, and map a path of the cable from the starting segment of the cable to the location of the first segment of the cable.

BRIEF DESCRIPTION OF THE DRAWINGS

FIG. 7 is a flow diagram for an example method of mapping a path of a cable in accordance with aspects of the disclosure.

FIG. 8 is a flow diagram for another example method of mapping the path of the cable in accordance with aspects of the disclosure.

DETAILED DESCRIPTION

Figure 1:
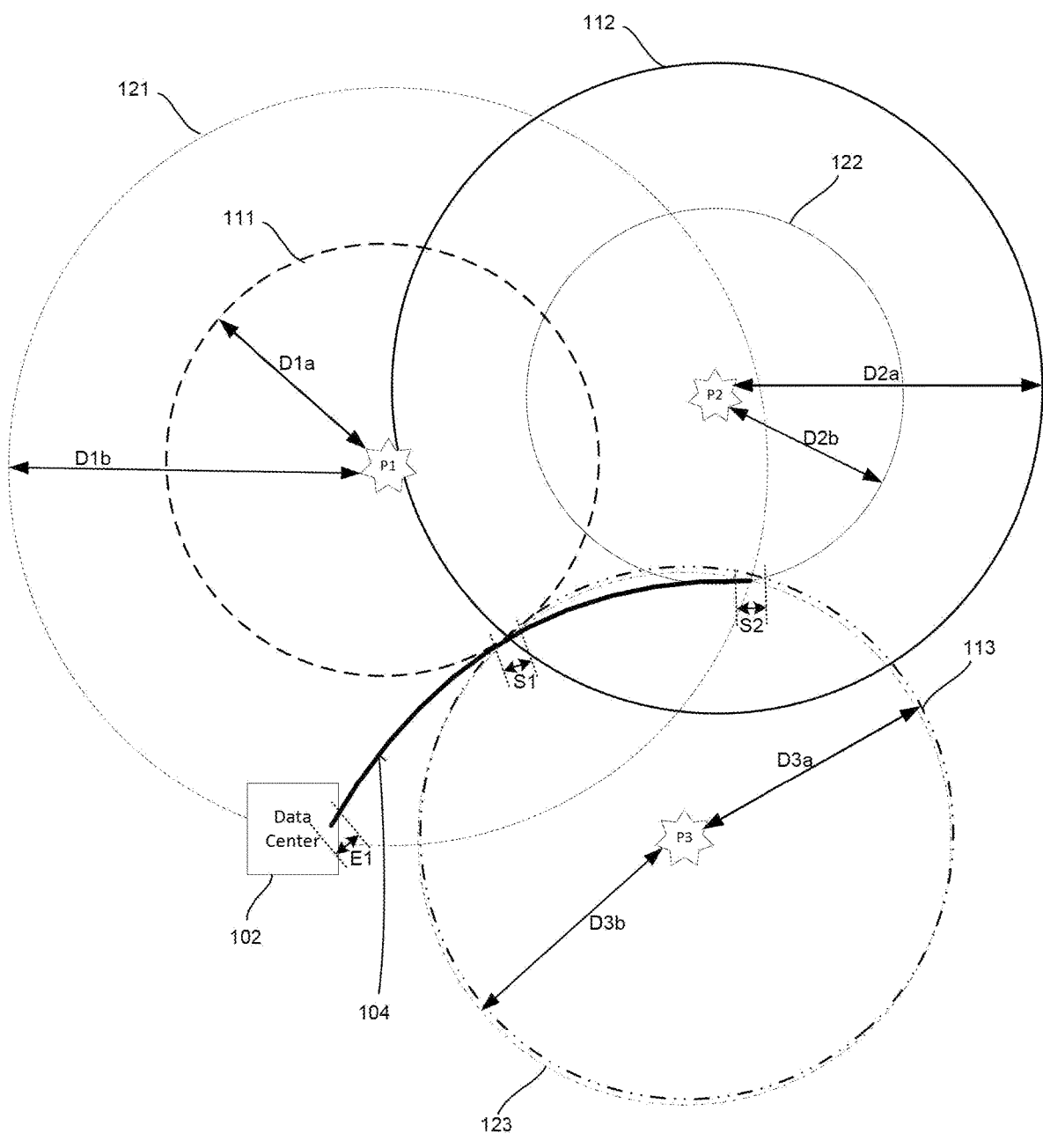
FIG. 1 is a pictorial diagram of an example of mapping a cable within a fiber network in accordance with aspects of the disclosure.

The technology is generally directed to a method of mapping fiber networks. The fiber networks may include a plurality of cables, such as fiber optic cables. The cables may be divided into channels, or segments. The cables may have a first end segment and a second end segment, each with a known location. When there is a mechanical perturbation that causes a given cable to vibrate, each segment of the cable may experience an associated strain at a different time. The location of each segment may be determined based on the known location of the perturbation sources, the known location of the cable end segments, and the relative time that the perturbation is detected at each cable segment. Using the location of the first segment, the location of the entire cable may be determined. According to some examples, the location of each segment may be determined by using the first or second end of cable as a reference and triangulating the location of the subsequent segment based on the known location of three or more perturbations.

The perturbations may be detected using distributed acoustic sensing ("DAS"). For example, the fiber networks may include an optoelectronic interrogator unit to perform DAS. The optoelectronic interrogator may inject short pulses of light into a cable and measure the optical distortions in the backscattered light to derive strain signals. The light injected into the cable travels at a constant velocity such that time-to-distance calculations may be used to localize the strain-rate signals of a segment of the cable. This may allow the cable to be used as a seismic-acoustic sensor.

As the perturbation propagates through the cable, it introduces strain on the cable. The strain on each segment of the cable may occur at different times, depending on the spatial location of the segments, and the velocity to which the perturbation propagated. According to some examples, the perturbation may arrive at a first segment of the cable, thereby straining the first segment of the cable, at a first time while the perturbation may arrive at a second segment of the cable, thereby straining the second segment of the cable, at a second time. The DAS may detect the time at which each segment is strained from the perturbation. The detected time is relative to the arrival time at the known location of the first or second end of the cable.

The perturbation may be, for example, an earthquake or environmental/urban noise. According to some examples, the perturbation may be observed by cross-correlating continuous noise from two or more instruments of known locations. For example, seismic waves traveling between a segment of the cable and a nearby standard seismometer may be extracted by cross-correlating the noise recorded by both. The identified perturbation may then be used to map the location of the cable segments. According to some examples, the instruments may be DAS systems or seismometers, whether along the cable path or outside of the cable path. The instruments may be devices that record the noise at the same time.

The velocity, or speed, of the perturbation may be determined based on the velocity the perturbation is traveling when the perturbation reaches one of the end segments of the cable. The velocity of the perturbation at the end segment of the cable may be determined using standard travel time formulas. For example, given the known location of the perturbation, e.g. the location of the earthquake, the distance between the perturbation and the end segment of the cable may be determined. The determined distance may then be used to determine the velocity at which the perturbation traveled from its origin to the end segment of the cable based on the time the perturbation arrives at the end segment of the fiber. According to some examples, the velocity at which the perturbation traveled from its origin to the end segment of the fiber may be the same or substantially the same at which the perturbation traveled to a subsequent segment. Given their close proximity, the velocity may be substantially constant between neighboring segments of the cable. According to some examples, the velocity of the perturbation may be substantially constant upon arrival at each segment of the cable as each segment of the cable may be small, compared to the entire length of the cable. In examples where at least a portion of the cable is buried in soil, soil around each subsequent segment may be substantially the same. When the soil around each subsequent segment is substantially the same, the velocity of the perturbation within the soil may be substantially the same upon arrival at each segment.

Based on the arrival time of the perturbation at each segment of the cable, and the known location of the perturbation, the location of each segment may be determined. The distance from the location of the perturbation to the segment of cable may be determined by multiplying the determined velocity with the arrival time. The distance may be used to identify a circumference around the perturbation. The segment may be located along the identified circumference. This may be repeated for additional perturbations with known locations. The distance from the location of each perturbation to the segment of cable may be determined based on the velocity of the perturbation and the arrival time of the perturbation at that segment of the cable. A circumference may be identified for each determined distance. The location of the segment of the cable may be at an intersection of three or more circumferences. The cable may be mapped based on the determined location of each segment.

Human intervention for mapping cables may be negated by mapping the cable using existing perturbations using the techniques described herein, such as earthquakes or environmental noise, with the latter requiring the cross-correlating of noise detected by two or more instruments of known locations. Additionally or alternatively, the use of existing perturbations as described herein may negate the need for prior knowledge on where sections of the cable are in operation, other than the starting location. This may increase the scalability and cost efficiency of mapping fiber networks while still generating an accurate map of the physical location of the fiber.

FIG. 1 illustrates an example of using known locations of perturbations to map a cable in a fiber network. As shown in FIG. 1, end segment E1 of a cable 104 may be located at a data center 102. The location of the data center 102, and therefore the location of the end segment E1, may be known. The data center 102 may include a DAS configured to detect perturbations P1, P2, P3 in the cable 104. The path traversed by the cable 104 after leaving the data center 102 may be mapped using the known locations of perturbations P1, P2, P3. While using three perturbations is discussed herein, more than three perturbations may be used. The greater the number of perturbations, the greater the accuracy of the map of the cable will be.

The end segment E1 of the cable may correspond to the start location of the cable 104. The remainder of the cable 104 may be divided into a plurality of segments S1-S$_n$. The length of each segment may be a predetermined length. For example, each segment may be 1 meter, 5 meters, 7 meters, 10 meters, 17 meters, etc. long. The length of each segment may be determined based on the length of the cable. Using smaller segment lengths may provide for increased accuracy in mapping the cable. For example, the shorter the length of each segment, the greater the accuracy of the map of the cable will be as there will be increased granularity of identified locations along the cable.

One or more perturbations P1, P2, P3, may cause the cable to vibrate. The perturbations may be seismic activity or noise, such as earthquakes or environmental noise. The perturbation induces strain on the cable. Each segment of the cable may be strained at a different time based on the location of the segment of the cable compared to the location of the perturbation P1, P2, P3. The DAS may detect the time each segment experiences a strain from the perturbation P1, P2, P3. Based on the time of the strain on a segment of the cable and the velocity of the perturbation P1, P2, P3, the location of each segment may be determined. For example, the velocity of each perturbation may be substantially constant for neighboring segments S1, S2. The perturbations P1, P2, P3 may strain the first segment S1 of the cable at a respective time. The distance D1$a$, D2$a$, D3$a$ from each perturbation P1, P2, P3 to the location of the first segment S1 may be determined by multiplying the respective velocity of the perturbation P1, P2, P3 with the respective time of the strain caused by the perturbation. The distances D1$a$, D2$a$, D3$a$ may be used to identify a circumference 111, 112, 113 around each respective perturbation P1, P2, P3. Each circumference 111, 112, 113 may indicate the possible location of the first segment S1 based on the respective perturbation P1, P2, P3. The location where the circumferences 111, 112, 113 intersect may be the location of the first segment S1 of the cable. The cable 104 may be mapped from the end segment E1 in the data center 102 to the first segment S1.

This may be repeated for each segment of the cable. For example, the second segment S2 may be determined based on the detected time of strain on the second segment S2 caused by each perturbation P1, P2, P3. Based on the detected time of the strain and the velocity of the perturbation, a distance D1$b$, D2$b$, D3$b$ between each perturbation P1, P2, P3 and the second segment S2 may be determined. The determined distances D1$b$, D2$b$, D3$b$ may be used to identify a circumference 121, 122, 123 around each perturbation P1, P2, P3. Each circumference 121, 122, 123 may indicate a possible location of the second segment S1 based on the respective perturbation P1, P2, P3. The second segment S1 may be located where the circumferences 121, 122, 123 intersect. The cable 104 may be mapped from the identified location of the first segment S1 to the second segment S2.

Figure 2A:
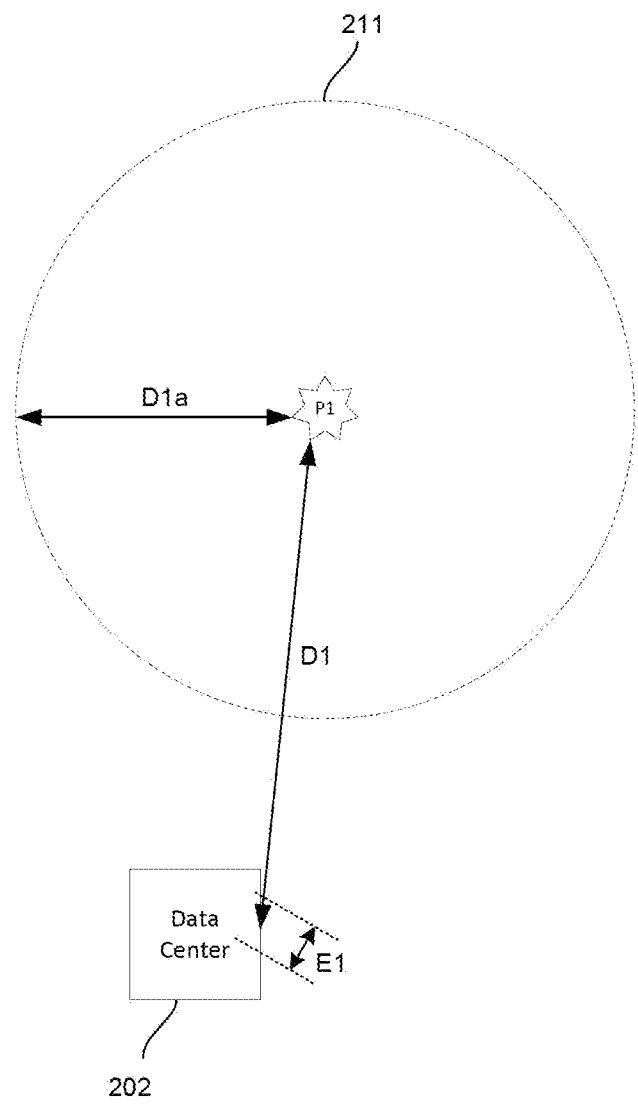
FIGS. 2A-2C are pictorial diagrams of an example method of mapping a segment of a cable within a network in accordance with aspects of the disclosure.
Figure 2B:
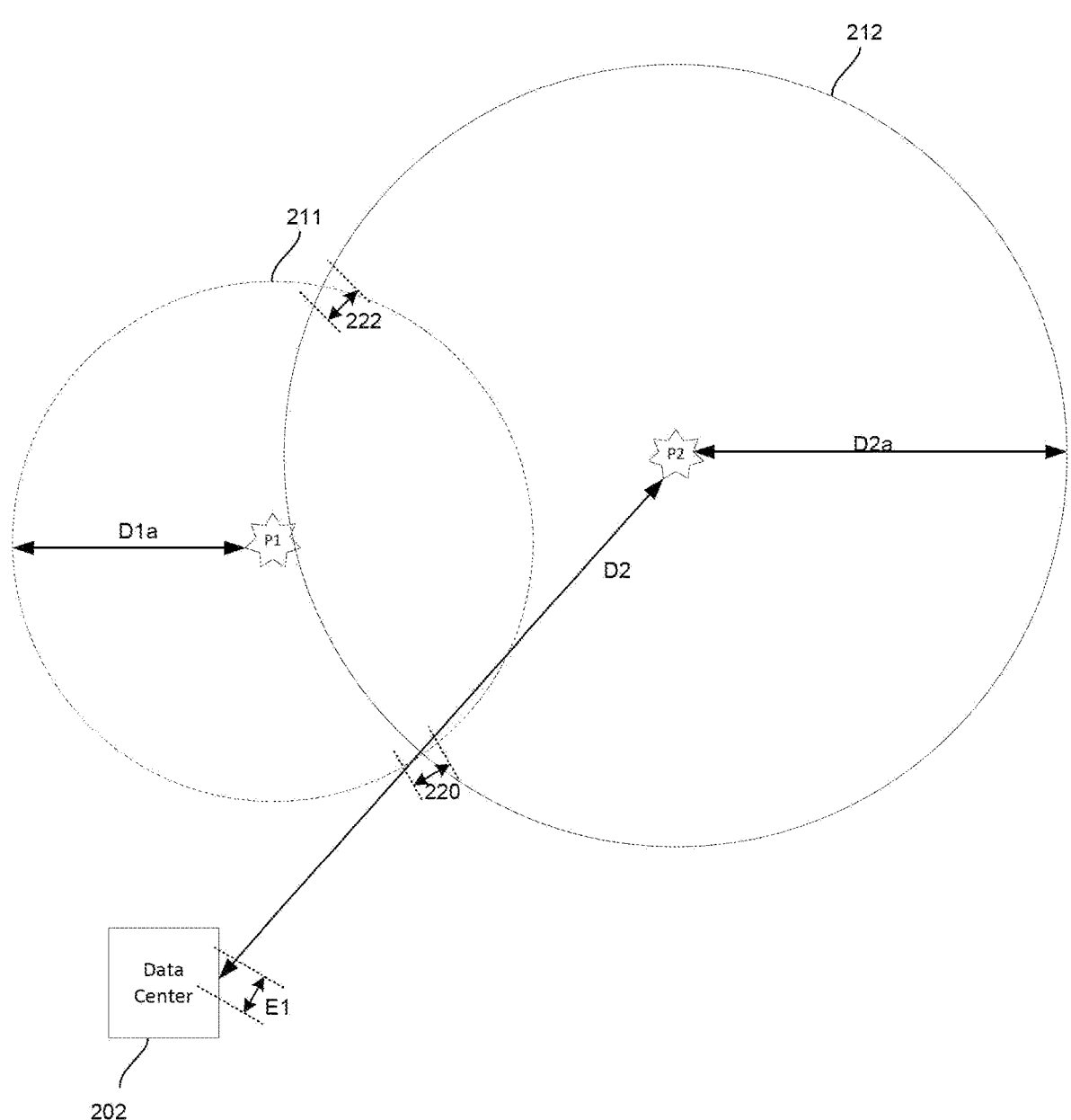
Figure 2C:
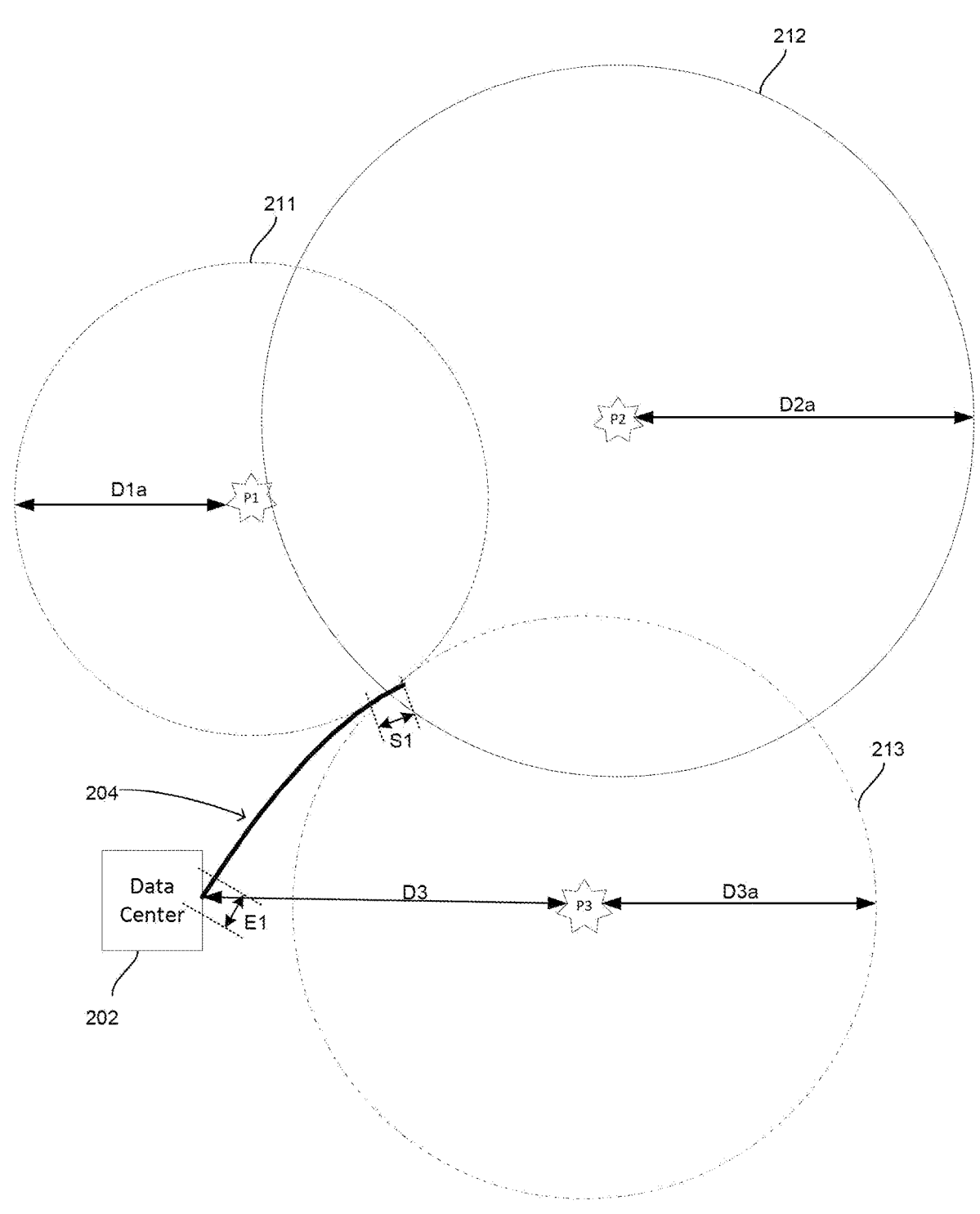

FIGS. 2A-2C illustrate an example method of mapping a segment of a cable within a network based on the known locations of perturbations. Data center 202 is at a known location. The data center 202 may include an optoelectronic interrogator unit to perform DAS. One or more cables may exit the data center 202. The location of an end segment E1 of a cable exiting the data center 202 may be known based on the known location of data center 202. The cable may be divided into segments S1-S$_n$. The location of each segment may be determined based on the known location of the end segment E1 of the cable, the known location of the perturbation sources and the relative time that the strain caused by the perturbation is detected at every other cable segment.

As shown in FIG. 2A, the DAS in the data center 202 may detect a first perturbation P1, such as an earthquake or environmental noise. The strain on the first segment of cable caused by first perturbation P1 may occur at a different time than the strain on the end segment E1 of the cable. The DAS may record the relative arrival time of the first perturbation P1 at the first segment of the cable relative to the arrival time of the perturbation of the at the first end segment E1 of the cable. The relative arrival time of the first perturbation P1 at the first segment of the cable may be determining the difference in arrival time of the first perturbation at the first segment of the cable and the end segment E1 of the cable. For example, the relative arrival time of the first perturbation P1 at the first segment may be determined by subtracting the arrival time of the first perturbation P1 at the first segment from the arrival time of the first perturbation P1 at the end segment E1. According to some examples, the strain on the first segment may occur at a different time than the strain on the end segment E1 based on their relative spatial location and/or the velocity to which the first perturbation P1 propagates. The time the strain on the first segment is detected may be determined relative to the time the strain is detected to the end segment E1 of the cable.

In examples where the perturbation is an earthquake, the location of the earthquake may be known based on reported locations from a local earthquake catalog. The location of the earthquake may be determined by government agencies, such as the United States Geological Service (USGS), or other local organizations, such as the Southern California Seismic Network (SCSN). In examples where the perturbation is environmental, or ambient, noise, the location of the perturbation may be the location of the second instrument that is being used to cross-correlate the noise with. The second instrument may be referred to as a virtual source.

The velocity, or speed, at which the perturbation P1 is traveling may be determined based on the time the strain is detected at the end segment E1 of the fiber and the known location of the first perturbation P1. The known location of the first perturbation P1 may be used to determine the distance D1 between the first perturbation P1 and the first end segment E1 of the cable. According to some examples, the velocity may be determined using standard travel time formulas based on the determined time of the strain and distance D1. According to some examples, the velocity of the perturbation along the cable may be constant or substantially constant. The velocity of the perturbation along the cable may be substantially constant as the segments of the cable may be small compared to the entire length of the cable. When the segments are small, each subsequent segment may be close enough to one another such that the velocity of the perturbation within the soil may be substantially the same.

The location of the first segment may be determined, at least partially, based on the arrival time of the first perturbation P1 at the first segment of the cable relative to the arrival time at the end segment E1 as well as the known location of first perturbation P1. For example, the relative arrival time of first perturbation P1 at the first segment of cable may be used to determine the distance D1$a$ between the first segment and the known location of first perturbation P1. The distance D1$a$ between the first segment and the known location of first perturbation P1 may be determined by multiplying the velocity of the first perturbation P1 by the relative arrival times of first perturbation P1 at first segment and the first perturbation P1 at the end segment E1 of the cable. The velocity may be determined as described above. The arrival times of the first perturbation at each segment may be determined by, for example, the DAS at a datacenter. The determined distance D1$a$ may be used to identify a circumference 211 around first perturbation P1. First segment S1 may be located along circumference 211.

As shown in FIG. 2B, the DAS in data center 202 may detect a second perturbation P2. The DAS may detect the time the first segment of the cable experiences a strain caused by the second perturbation P2 relative to the strain of second perturbation P2 on the end segment E1 of the cable.

The detected time of arrival of the second perturbation P2 at the first end segment E1 of the cable may be used to determine the velocity at which second perturbation P2 is traveling. For example, based on the time second perturbation P2 is detected at the end segment E1 of the cable and the known location of second perturbation P2, the velocity of second perturbation P2 may be determined using standard time travel formulas. According to some examples, the known location of second perturbation P2 may be used to determine the distance D2 between second perturbation P2 and the end segment E1 of cable 204. The distance D2 may be used when determining the velocity of second perturbation P2.

The location of the first segment of the cable may be determined based on the relative arrival time of second perturbation P2 at the first segment of the cable and the known location of second perturbation P2. For example, the distance D2$a$ between the location of the first segment and the location of second perturbation P2 may be determined based on the velocity of second perturbation P2 and the relative arrival time of second perturbation P2 at the first segment. The relative arrival time of the second perturbation P2 at the first segment may be determined based on the difference in arrival time of the second perturbation P2 at the first segment and the end segment E1. The distance D2$a$ may be determined by multiplying the relative arrival time of the second perturbation P2 at the first segment and the velocity of second perturbation P2. The distance D2$a$ may be used to identify a circumference 212 around second perturbation P2. The location of the first segment of the cable may be located along circumference 212.

According to some examples, the first segment of the cable may be located where circumference 211 and circumference 212 intersect, within a tolerance. As shown in FIG. 2B, circumference 211 and circumference 212 intersect at two locations 220, 222. To determine which locations 220, 222 correspond to the location of first segment S1, a third perturbation may be mapped.

As shown in FIG. 2C, the DAS in data center 202 may detect a third perturbation P3. Similar to the process with respect to first perturbation P1 and second perturbation P2, the DAS may detect the time the first segment S1 of the cable 204 experiences a strain caused by the third perturbation P3 relative to the strain of third perturbation P3 on the end segment E1 of cable 204. The detected time may be used to determine the velocity at which third perturbation P3 is traveling. For example, using standard time travel formulas, the velocity at which the third perturbation P3 is traveling may be determined based on the detected arrival time at the end segment E1 of cable 204 and the distance D3 between the known location of third perturbation P3 and the location of end segment E1.

The location of the first segment S1 of cable 204 may be determined based on the relative arrival time of third perturbation P3 at the first segment S1 of cable 204 and the known location of third perturbation P3. For example, the distance D3$a$ between first segment S1 and the location of third perturbation P3 may be determined based on the velocity of the third perturbation P3 and the relative arrival time of third perturbation P3 at first segment S1. The distance D3$a$ may be determined by multiplying the relative arrival time and the velocity of third perturbation P3. The distance D3$a$ may be used to identify a circumference 213 around third perturbation P3. First segment S1 may be located along circumference 213.

A location of the first segment S1 may be identified using the intersection of circumference 211, circumference 212, and circumference 213. The cable 204 may be mapped from end segment E1 in data center 202 to the location of first segment S1.

This process may be repeated for each segment of the cable 204. For example, as shown in FIG. 1, the second segment S2 may be determined based on the detected relative time of strain on the second segment S2 caused by each perturbation P1, P2, P3. Base on the detected relative time of the strain and the known location of the permutations P1, P2, P3, a distance D2$a$, D2$b$, D3$b$ between each perturbation P1, P2, P3 and the second segment S2 may be determined. The determined distances D1$b$, D2$b$, D3$b$ may be used to identify a circumference around each perturbation P1, P2, P3. Each circumference may indicate a possible location of the second segment S2 based on the respective perturbation P1, P2, P3. The second segment S2 may be located where the circumferences intersect. The cable may be mapped from the identified location of the first segment S1 to the second segment S2.

Figure 3:
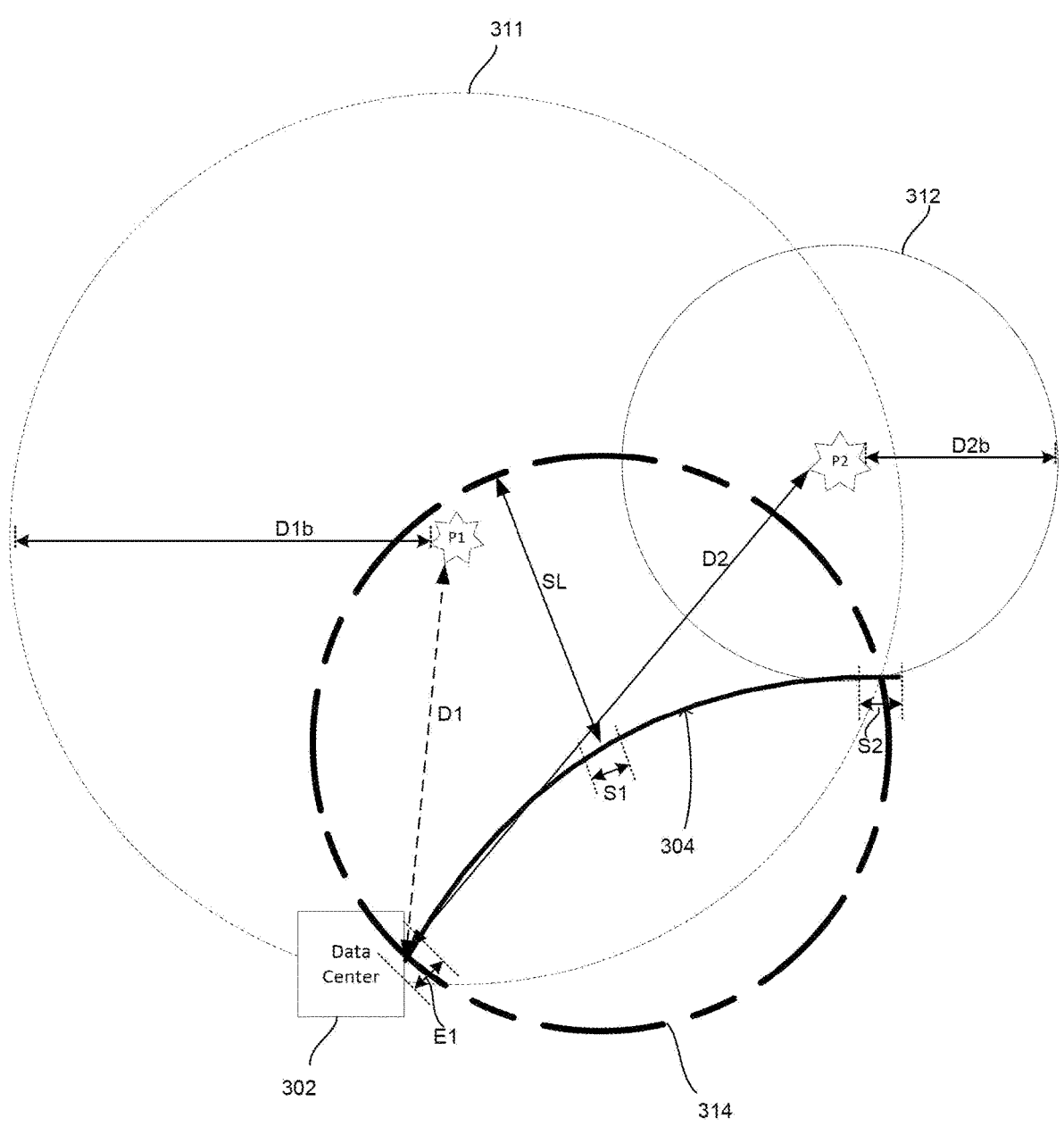
FIG. 3 is a pictorial diagram of another example method of mapping a segment of a cable within a network in accordance with aspects of the disclosure.

FIG. 3 illustrates another example of using known locations of perturbations to map a cable in a fiber network. In the example shown, the length of each channel, or segment, of the cable may be used in conjunction with the known locations of the perturbations to map the cable.

As shown in FIG. 3, the location of first segment S1 of cable 304 may have been determined. The location of second segment S2 of cable 304 may be determined using a first perturbation P1, a second perturbation P2, and a known distance between the first segment S1 and the second segment S2. The known distance between the first segment S1 and the second segment S2 may be the segment length SL. The segment length SL may be determined based on the length of the cable. According to some examples, the cable may be segmented into an infinite number of segments. A greater number of segments may provide for increased accuracy when mapping the cable.

The DAS in data center 302 may detect the first perturbation P1. The strain on end segment E1 caused by the first perturbation P1 may occur at a different time than the strain on the first segment S1 and second segment S2. The difference in arrival time of the perturbation P1 at end segment E1, first segment S1, and second segment S1 may be based on the relative geo-spatial location of end segment E1, first segment S1, and second segment S1 and/or the velocity to which the first perturbation P1 propagates. The time the strain is detected on first segment S1 and second segment S2 may be determined relative to the time the strain is detected at the end segment E1 of cable 304. The relative time of strain at each segment of the cable may be determined based on the difference between arrival time at a respective segment and the arrival time at end segment E1 of cable 304.

The velocity at which first perturbation P1 is traveling when it reaches the second segment S2 may be the same, or substantially the same velocity first perturbation P1 was traveling when it reached end segment E1. The velocity of first perturbation P1 may be determined using standard travel times formulas based on the known location of first perturbation P1 and the time the strain was detected at end segment E1. The known location of the first perturbation P1 may be used to determine the distance D1 between the first perturbation P1 and the end segment E1.

The location of the second segment S2 may be determined based on the arrival time of first perturbation P1 at the second segment S2 of cable 304 and the known location of first perturbation P1. For example, the arrival time of first perturbation P1 at second segment S2 may be used to determine the distance D1$b$ between the first perturbation P1 and second segment S2 by multiplying the velocity of first perturbation P1 by the arrival time of first perturbation P1 at second segment S2. The determined distance D1$b$ may be used to identify a circumference 311 around first perturbation P1. Second segment S2 may be located along circumference 311.

The process of identifying a circumference around a perturbation may be repeated for the second perturbation P2. For example, the velocity of the second perturbation P2 may be determined using standard time travel formulas based on the distance D2 between the second perturbation P2 and the end segment E1 as well as the arrival time of the second perturbation P2 at the end segment E1. The distance D2 between the second perturbation P2 and the end segment E1 may be determined based on the known location of the end segment E1 and the known location of the second perturbation P2. The distance D2$b$ between the second perturbation P2 and the second segment S2 may be determined by multiplying the determined velocity of the perturbation P2 by the relative arrival time of the second perturbation P2 at the second segment S2. The relative arrival time of the second perturbation P2 at the second segment S2 may be determined based on the difference of arrival time at the second segment S2 and arrival time at the end segment E1. The determined distance D2$b$ may be used to identify a circumference 312 around the second perturbation P2. Second segment S2 may be located along circumference 312. According to some examples, second segment S2 may be located where circumference 311 and circumference 312 intersect.

Circumference 311 and circumference 312 may intersect in two locations. To determine which of the two intersection points corresponds to the location of the second segment, a circumference 314 having a diameter corresponding to the segment length SL may be identified around the previously identified location of the first segment S1. The location of the second segment S2 may be located along circumference 314. According to some examples, the location of the second segment S2 may be located where circumference 311, circumference 312, and circumference 314 intersect.

Figure 4:
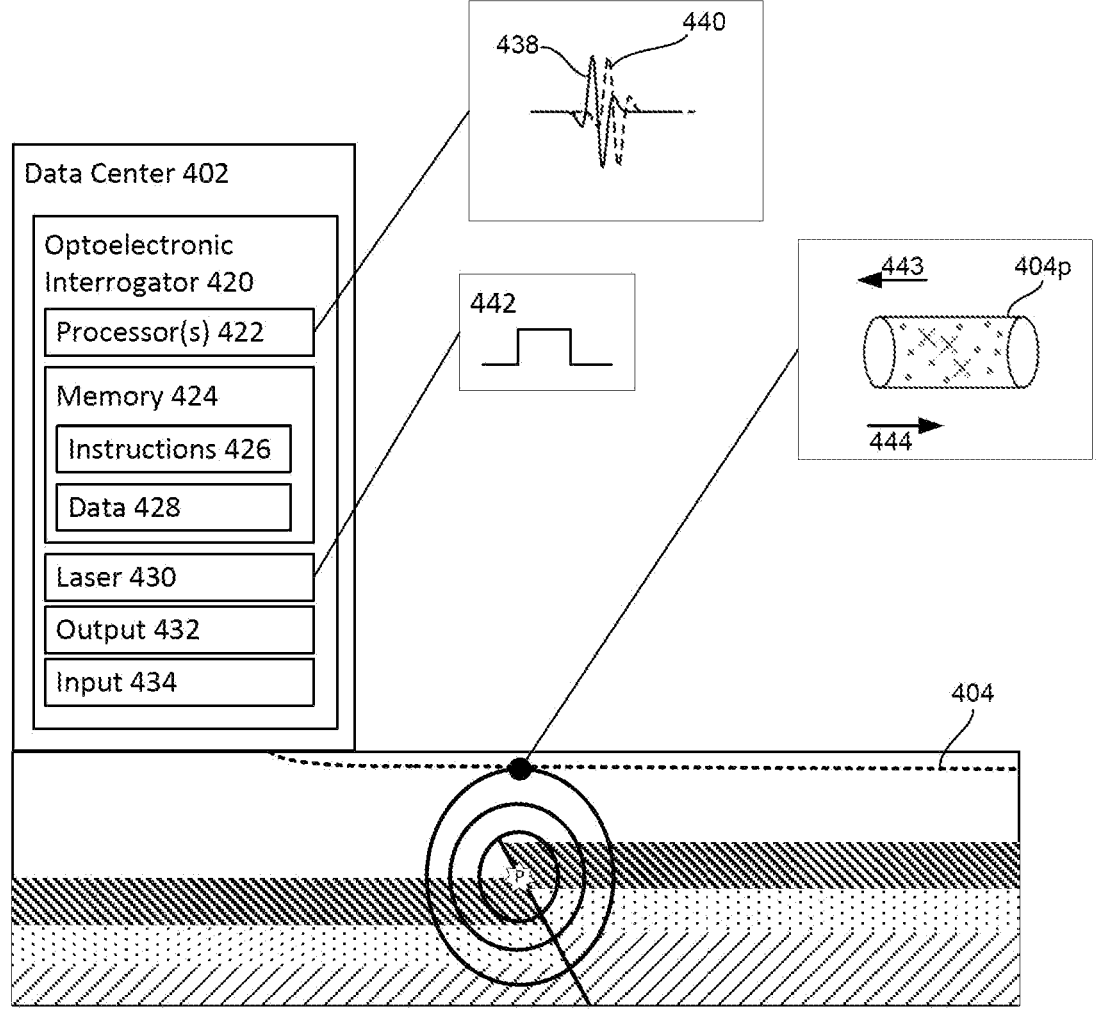
FIG. 4 is an example use of an optoelectronic interrogator within a data center for mapping cables in a fiber network in accordance with aspects of the disclosure.

FIG. 4 illustrates how an optoelectronic interrogator in a data center may be used to map cables in a fiber network. The data center 402 may include an optoelectronic interrogator 420. The optoelectronic interrogator 420 may include one or more processors 422, memory 424, instructions 426, data 428, laser(s) 430, output(s) 432, and input(s) 434.

Memory 424 of optoelectronic interrogator 420 may store information that is accessible by processor 422. Memory 424 may also include data that can be retrieved, manipulated or stored by the processor 422. The memory 424 may be of any non-transitory type capable of storing information accessible by the processor 422, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. Memory 424 may store information that is accessible by the processors 422, including instructions 426 that may be executed by processors 422, and data 428.

Data 428 may be retrieved, stored or modified by processors 422 in accordance with instructions 426. For instance, although the present disclosure is not limited by a particular data structure, the data 428 may be stored in computer registers, in a relational database as a table having a plurality of different fields and records, XML documents, or flat files. The data 428 may also be formatted in a computer-readable format such as, but not limited to, binary values, ASCII or Unicode. By further way of example only, the data 428 may comprise information sufficient to identify the relevant information, such as numbers, descriptive text, proprietary codes, pointers, references to data stored in other memories (including other network locations) or information that is used by a function to calculate the relevant data.

The instructions 426 can be any set of instructions to be executed directly, such as machine code, or indirectly, such as scripts, by the processor 422. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

The one or more processors 422 may include any conventional processors, such as a commercially available CPU or microprocessor. Alternatively, the processor can be a dedicated component such as an ASIC or other hardware-based processor. Although not necessary, optoelectronic interrogator 420 may include specialized hardware components to perform specific computing functions faster or more efficiently.

Although FIG. 4 functionally illustrates the processor, memory, and other elements of optoelectronic interrogator 420 as being within the same respective blocks, it will be understood by those of ordinary skill in the art that the processor or memory may actually include multiple processors or memories that may or may not be stored within the same physical housing. Similarly, the memory may be a hard drive or other storage media located in a housing different from that of the optoelectronic interrogator 420. Accordingly, references to a processor or device will be understood to include references to a collection of processors or devices or memories that may or may not operate in parallel.

Output 432 may be a display, such as a monitor having a screen, a touch-screen, a projector, or a television. The output 432 of the optoelectronic interrogator 420 may electronically display information to a user via a graphical user interface ("GUI") or other types of user interfaces. For example, output 432 may electronically display a map interface identifying the location of one or more cables in the fiber network.

The input 434 may be a mouse, keyboard, touch-screen, microphone, or any other type of input.

The laser 430 may inject short pulses of light 442 into the cable. The pulses of light 442 may travel within cable 404 in the direction shown by arrow 444. When a perturbation P causes a strain on a portion 404*p* of cable 404, back scattered light may travel within cable 404 in the direction shown by arrow 443. In such an example, the pulses of light 442 may travel within cable 404 in a direction away from data center 402 while back scattered light may travel in a direction towards data center 402. The optoelectronic interrogator 420 may use DAS to measure the optical distortions in the back scattered light. The backscattered light may be due to imperfections embedded in the cable. When the cable is strained, the relative positions of the imperfections may change, such as when the cable is elongated or compressed due to the strain. The change in relative position of the imperfections may cause the shape of the backscattered light pulse to change. The change in relative position and/or change in the shape of the pulse may be determined by comparing how advanced or delayed in time the light pulse is when the cable is strained to the light pulse when the cable is not strained. For example, the light pulse 440 when the cable is strained may be compared to the light pulse 438 when the cable is not strained. The differences in light pulse 440 as compared to light pulse 438 may be optical distortions. The optical distortions in the back scattered light may be used to derive strain rate signals caused by perturbation P at portion 404*p* of cable 404. The strain rate signal rate signal for perturbation P may be the same, or substantially the same, along cable 404. The location of respective cable portions of cable 404 may, therefore, be determined, based on the known location of perturbation P and the relative time when the strain rate signal of perturbation P is detected in a respective different segment of the cable.

Figure 5:
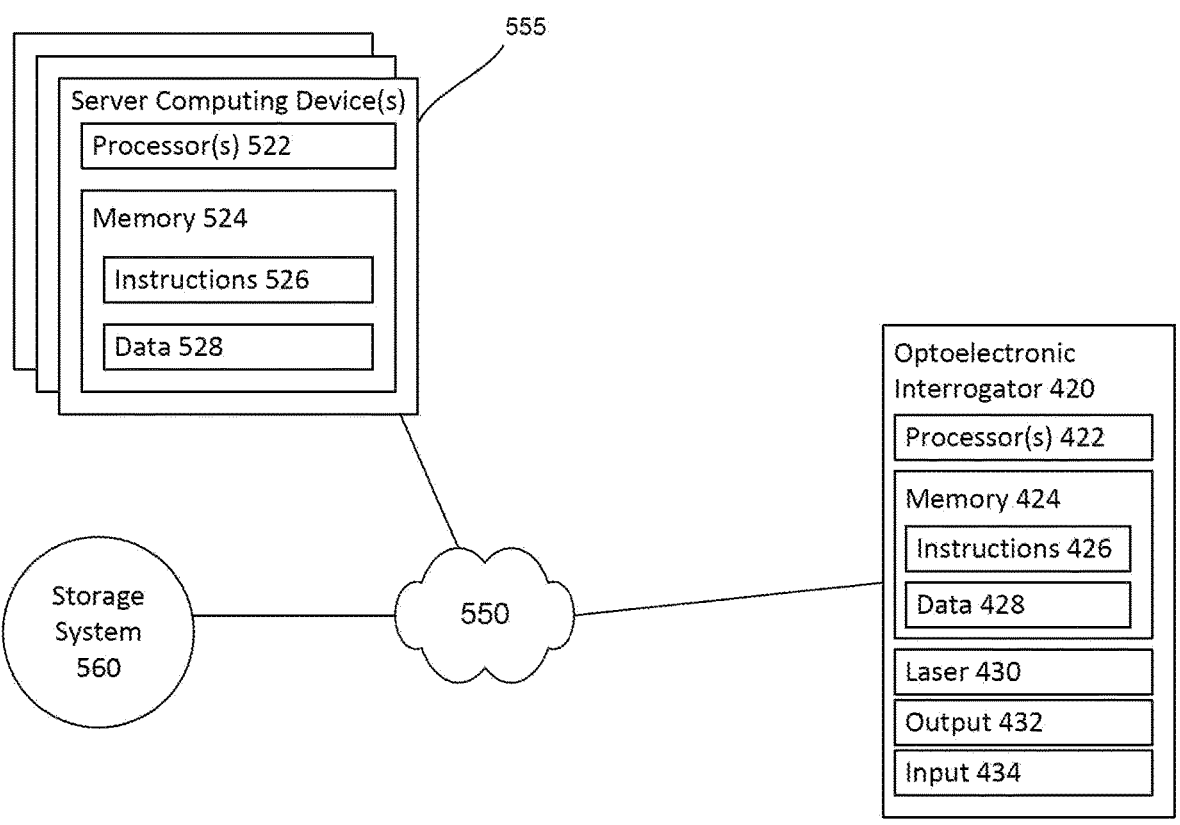
FIG. 5 is a functional diagram of an example system in accordance with aspects of the disclosure.

FIG. 5 illustrates an example system in which the features described above and herein may be implemented. It should not be considered limiting the scope of the disclosure or usefulness of the features described herein. In this example, system 500 may include optoelectronic interrogator 420, as described with respect to FIG. 4, server computing device 555, storage system 560, and network 550.

Optoelectronic interrogator 420 may be at a node of network 550 and capable of directly and indirectly communicating with other nodes of network 550. Although only one optoelectronic interrogator 420 is depicted in FIG. 5, it should be appreciated that a typical system can include one or more optoelectronic interrogators, with each optoelectronic interrogator being at a different node of network 550. The network 550 and intervening nodes described herein can be interconnected using various protocols and systems, such that the network can be part of the Internet, World Wide Web, specific intranets, wide area networks, or local networks. The network 550 can utilize standard communications protocols, such as WiFi, Bluetooth, 4G, 5G, etc., that are proprietary to one or more companies. Although certain advantages are obtained when information is transmitted or received as noted above, other aspects of the subject matter described herein are not limited to any particular manner of transmission.

In one examples, system 500 may include one or more server computing devices 555 having a plurality of computing devices, e.g., a load balanced server farm, that exchange information with different nodes of a network for the purpose of receiving, processing and transmitting the data to and from other computing devices. For instance, one or more server computing devices 555 may be a web server that is capable of communicating with the one or more optoelectronic interrogators 420 via the network 550. In addition, server computing device 555 may use network 550 to transmit and present information to optoelectronic interrogators 420. Server computing device 555 may include one or more processors 522, memory 524, instructions 526, data 528, etc. These components operate in the same or similar fashion as those described above with respect to optoelectronic interrogators 420.

Storage system 560 may store various types of information. For instance, the storage system 560 may store data or information related to locations of perturbations. In some examples, storage system 560 may store map data. This map data may include, for instances, locations of data centers, perturbations, cable locations, etc.

Figure 6A:
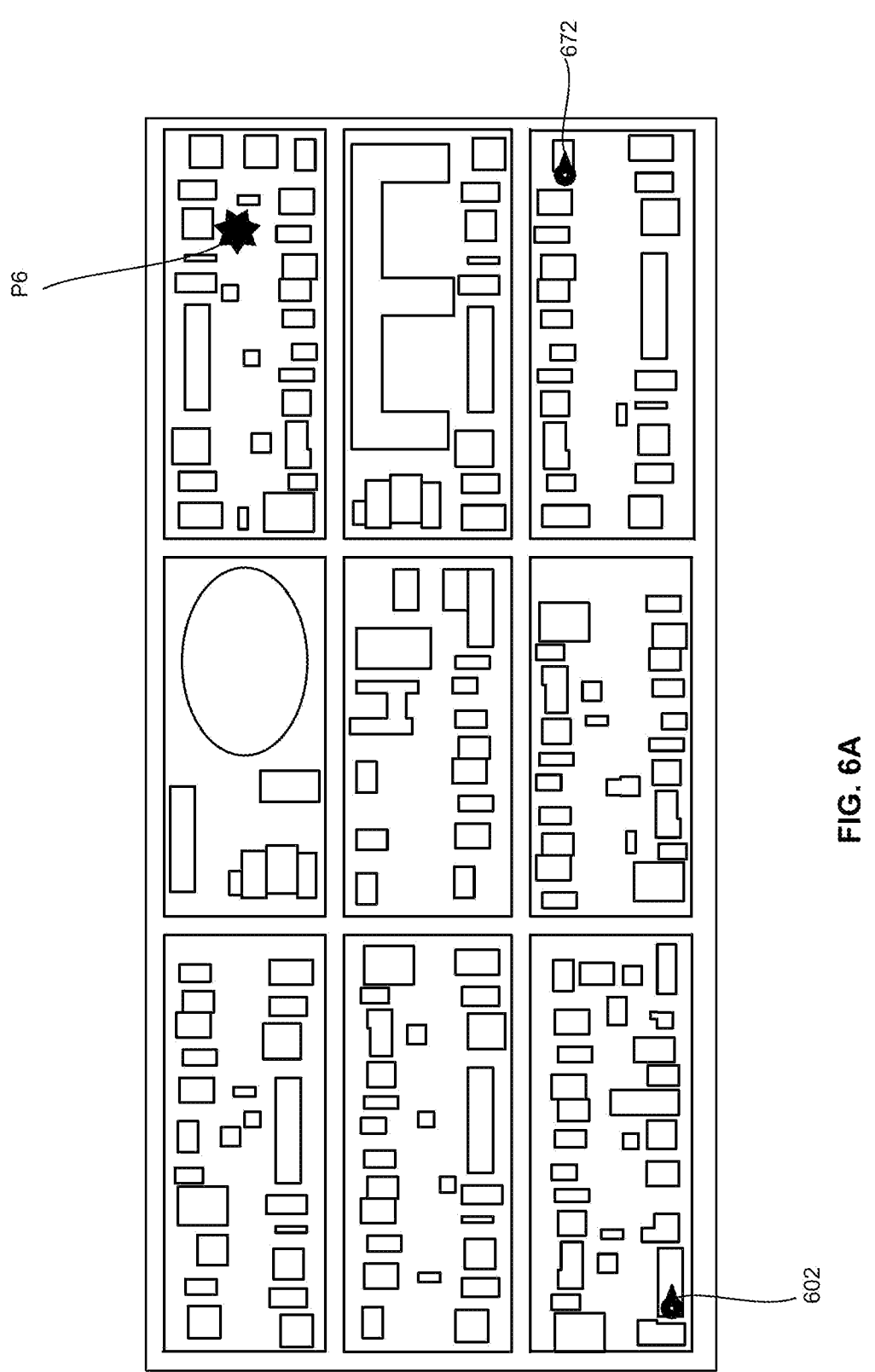
FIG. 6A is a pictorial diagram of a map indicating the known locations of a data center and perturbation in accordance with aspects of the disclosure.

FIG. 6A illustrates an example in which the location of an end segment of cable and a perturbation is known. The end segment of the cable may be located within data center 602. The location of the end segment of the cable and the location of the perturbation P6 may be used to map the remainder of the cable. The perturbation P6 may be an earthquake. The perturbation P6 may cause a strain on the cable.

Figure 6B:
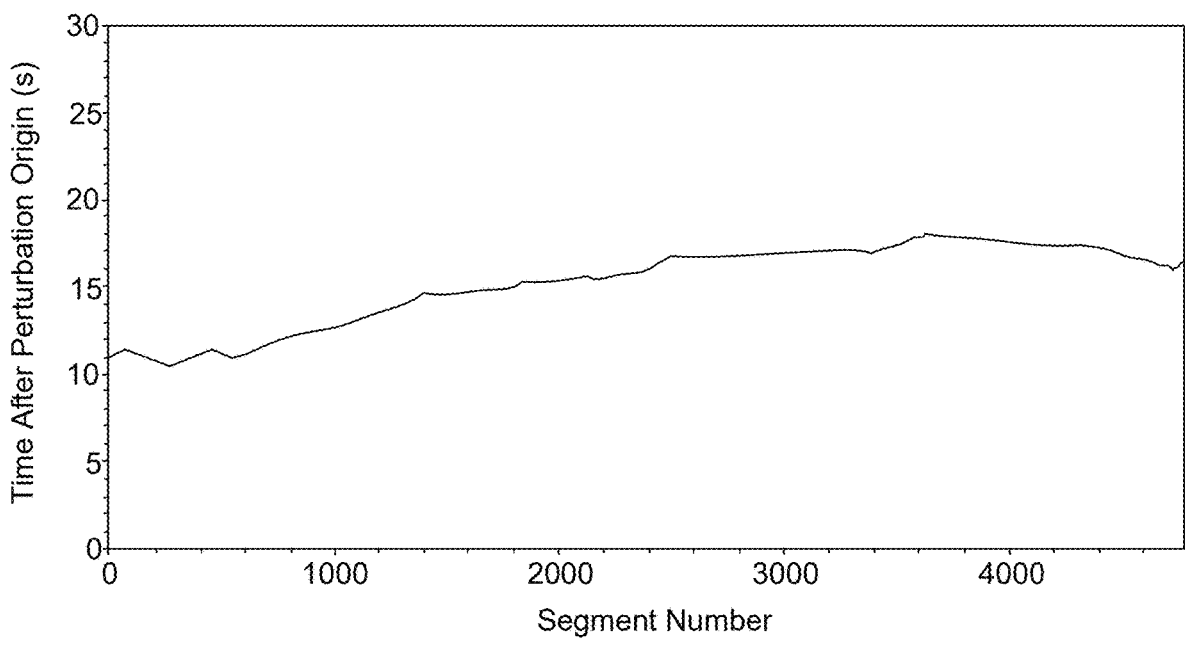
FIG. 6B is a graphical representation of when each segment of a cable experiences a strain due to a perturbation in accordance with aspects of the disclosure.

FIG. 6B illustrates an example graphical representation of the time each segment of the cable experiences a strain from perturbation P6. Each segment of the cable may experience the strain at a different time. The time each segment experiences a strain from perturbation P6 may be recorded relative to the time the end segment of the cable experiences the strain. The end segment of the cable may be segment number 0.

To determine the position of each segment relative to the perturbation, the velocity of the perturbation may be determined. The velocity of the perturbation may be determined using standard travel time formulas. For example, given the known location of perturbation P6, the distance between perturbation P6 and the end segment of the cable in data center 602 may be determined. Based on the time perturbation P6 was detected at the end segment of the cable and the distance between the end segment of the cable and perturbation P6, the velocity at which the perturbation P6 traveled from its origin to the end segment of the cable may be determined. According to some examples, the velocity of the perturbation P6 may be the same, or substantially the same, at each subsequent segment of the cable. This may be due to the length of the segments being small, compared to the entire length of the cable, such that the soil is substantially the same. In examples where at least a portion of the cable is buried within the ground, the soil may be substantially the same around each subsequent segment within the ground such that the velocity of the perturbation may be substantially constant upon arrival at the segments.

Figure 6C:
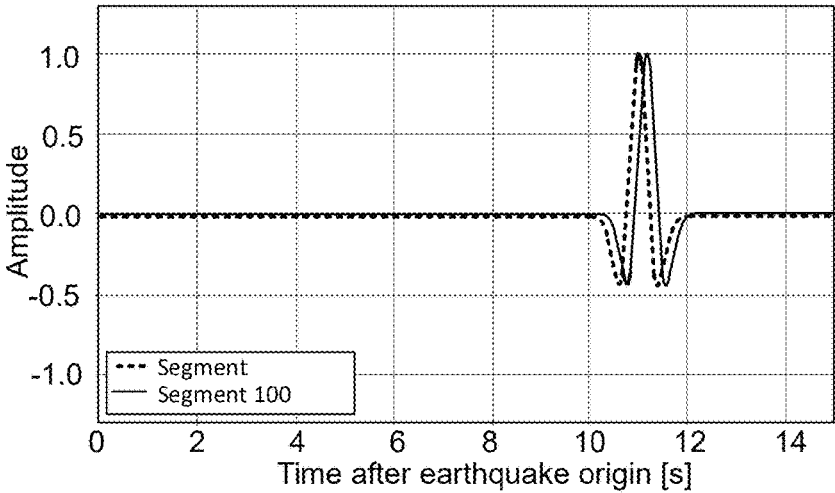
FIG. 6C is a graphical comparison of a time a strain is detected at different segments of a cable in accordance with aspects of the disclosure.

FIG. 6C illustrates a graphical comparison of the time the strain is detected at different segments of the cable. In particular, FIG. 6C illustrates a graphical comparison of the time the strain is detected at the end segment of the cable in data center 602 as compared to the time the strain is detected at segment 100. The different in arrival time between the end segment of the cable in data center 602 and segment 100 may be 0.20 second. As the end segment of the cable is in close proximity to segment 100, the difference in arrival time may be due to the difference in geographical location of the end segment and segment 100. Using the known location of perturbation P6 and the location of the end segment of the cable in data center 602, as well as the relative time perturbation P6 is detected at each segment, the geographical location of each segment may be determined using the methods described above and herein.

While FIGS. 6A-6C illustrate mapping a cable of a fiber network based on the location of perturbation P6, the cable may be mapped using any source that produces mechanical perturbations. For example, Earth's background vibrations, such as ambient seismic noise, may be used to extract seismic waves to perform cable route mapping. The seismic waves may be extracted by cross-correlating noise detected by two or more instruments of known locations. The instruments may be devices that record noise at the same time. According to some examples, the instruments may be opto-electronic interrogators, DAS systems, or seismometers, whether along the cable path or outside the cable path. For example, seismic waves traveling between a segment of the cable and a nearby seismometer 672 may be extracted by cross-correlating the noise recorded by the cable connected to data center 202 and the seismometer 672. The extracted seismic wave may be a perturbation used to map the location of the cable segments.

FIG. 7 illustrates an example method for mapping a path of a cable. The following operations do not have to be performed in the precise order described below. Rather, various operations can be handled in a different order or simultaneously, and operations may be added or omitted.

In block 710, a starting segment of a cable may be identified. The cable may be divided into a plurality of segments. The starting segment may be a segment with a known location. According to some examples, the starting segment of the cable may be at an end segment of the cable. For example, the starting segment may be the segment of the cable coupled to the DAS system within the data center.

In block 720, the system may detect, at a first segment of the cable, three or more perturbations occurring at a respective distance from the first segment. The first segment of the cable may be adjacent to the starting segment of the cable. The perturbations may be, for example, earthquakes or environmental noise. The location of the origin of each perturbation may be known. According to some examples, when detecting the perturbations, the system may determine at the first segment a respective arrival time of the perturbation for each of the three or more perturbations. According to some examples, the system may determine the respective arrival time of the perturbation at each segment of the plurality of segments.

In block 730, the system may determine, based on the detected three or more perturbations, the respective distance between each of the three or more perturbations and a location of the first segment of the cable. When determining the respective distance between each of the perturbations and the location of the first segment of the cable, the system may determine a velocity of each of the three or more perturbations. The velocity of each perturbation may be determined based on the distance between the starting segment of the cable and the location of the perturbation as well as the time of arrival of the perturbation at the starting segment of the cable.

In block 740, the system may triangulate, based on the determined distances, the location of the first segment of the cable. For example, the system may identify a circumference around each of the perturbations. The diameter of each circumference may correspond to the respective distance between each of the three or more perturbations and the location of the first segment of the cable. The location of the first segment of the cable may be where the circumferences intersect.

In block 750, the system may map a path of the cable from the starting segment of the cable to the location of the first segment of the cable.

According to some examples, the system may detect at each of the plurality of segments, the three or more perturbations that occur at a respective distance from each of the plurality of segments. The system may determine, based on the detected perturbations, the respective distance between each of the perturbations and the respective location of each of the plurality of segments. The system may triangulate, based on the determined distances, the location of each of the plurality of segments. The system may map the path of the cable between each of the plurality of segments.

FIG. 8 illustrates another example method for mapping a path of a cable. The following operations do not have to be performed in the precise order described below. Rather, various operations can be handled in a different order or simultaneously, and operations may be added or omitted.

In block 810, the system may identify a starting segment of a cable having a plurality of segments. Each segment of the plurality of segments may have a length. The length of each segment of the plurality of segments may be the same. The starting segment may be a segment with a known location. According to some examples, the starting segment of the cable may be at an end segment of the cable. For example, the starting segment may be the segment of the cable coupled to the DAS system within the data center.

In block 820, the system may detect at a first segment of the cable two or more perturbations occurring at a respective distance from the first segment. The first segment of the cable may be adjacent to the starting segment of the cable. The perturbations may be, for example, earthquakes or environmental noise. The location of the origin of each perturbation may be known. According to some examples, when detecting the perturbations, the system may determine at the first segment a respective arrival time of the perturbation for each of the three or more perturbations. According to some examples, the system may determine the respective arrival time of the perturbation at each segment of the plurality of segments.

In block 830, the system may determine, based on the detected two or more perturbations, the respective distance between each of the two or more perturbations and a location of the first segment of the cable. When determining the respective distance between each of the perturbations and the location of the first segment of the cable, the system may determine a velocity of each of the two or more perturbations. The velocity of each perturbation may be determined based on the distance between the starting segment of the cable and the location of the perturbation as well as the time of arrival of the perturbation at the starting segment of the cable.

In block 840, the system may triangulate, based on the determined distances and the length of the plurality segments, the location of the first segment of the cable. For example, the system may identify a circumference around each of the perturbations. The diameter of each circumference may correspond to the respective distance between each of the two or more perturbations and the location of the first segment of the cable. The system may identify a circumference around the starting segment of the cable. The diameter of the circumference around the starting segment of the cable may correspond to the length of the segments. The location of the first segment of the cable may be where the circumferences around the perturbations and the circumference around the starting segment intersect.

In block 850, the system may map a path of the cable from the starting segment of the cable to the location of the first segment of the cable.

According to some examples, the system may detect at each of the plurality of segments, the three or more perturbations that occur at a respective distance from each of the plurality of segments. The system may determine, based on the detected perturbations, the respective distance between each of the perturbations and the respective location of each of the plurality of segments. The system may triangulate, based on the determined distances and the length of the segments, the location of each of the plurality of segments. The system may map the path of the cable between each of the plurality of segments.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of mapping an underground cable in a fiber network, comprising:

detecting, by the one or more processors, backscattered light of pulses of light injected by a laser, wherein the backscattered light is caused by three or more perturbations at a first segment of the cable;

detecting at the first segment of the cable, by the one or more processors based on the backscattered light, the three or more perturbations occurring at respective locations from the first segment, wherein:

at least three of the three or more perturbations occur from a respective perturbation source, and the detecting comprises determining, based on backscattered light, respective strain rate signals;

determining, by the one or more processors based on the detected three or more perturbations and the respective strain rate signals, respective distances between each of the three or more perturbations and the first segment of the cable;

triangulating, by the one or more processors based on the respective distances, a location of the first segment of the cable;

mapping, by the one or more processors, a path of the cable from a starting segment of the cable to the location of the first segment of the cable; and providing for output, by the one or more processors, a map of the path of the cable in the fiber network.

2. The method of claim 1, wherein detecting the three or more perturbations further includes determining, by the one or more processors, a respective time of arrival of the perturbation at the first segment for each of the three or more perturbations.

3. The method of claim 2, wherein determining the distance between each of the three or more perturbations and the location of the first segment of the cable comprises determining, by the one or more processors, a velocity of each of the three or more perturbations.

4. The method of claim 3, further comprising:

determining at the starting segment of the cable, by the one or more processors, a respective time of arrival of each of the three or more perturbations;

determining, by the one or more, a respective distance between the starting segment of the cable and each of the three or more perturbations; and determining, by the one or more processors based on the respective time of arrival of the perturbation at the starting segment of the cable and the respective distance between the starting segment of the cable and each of the three or more perturbations, the velocity of each of the three or more perturbations.

5. The method of claim 1, wherein the starting segment of the cable is at an end segment of the cable and the first segment of the cable is adjacent to the starting segment.

6. The method of claim 1, wherein the cable includes a plurality of segments.

7. The method of claim 6, further comprising:

detecting at each of the plurality of segments, by the one or more processors, the three or more perturbations occurring at respective locations from each of the plurality of segments;

determining, by the one or more processors based on the detected three or more perturbations, the respective distance between each of the three or more perturbations and each the plurality of segments;

triangulating, by the one or more processors based on the respective determined distances, a location of each of the plurality of segments; and mapping, by the one or more processors, the path of the cable between each of the plurality of segments.

8. A system for mapping an underground cable in a fiber network, comprising:

a laser configured to inject pulses of light into a starting segment of a cable;

one or more processors, the one or more processors configured to:

identify a starting segment of a cable;

detect backscattered light of the injected pulses of light, wherein the backscattered light is caused by three or more perturbations at a first segment of the cable;

detect at the first segment of the cable, based on the backscattered light, the three or more perturbations occurring at respective locations from the first segment, wherein:

at least three of the three or more perturbations occur from a respective perturbation source, and the detecting comprises determining, based on backscattered light, respective strain rate signals;

determine, based on the detected three or more perturbations and the respective strain rate signals, respective distance between each of the three or more perturbations and the first segment of the cable;

triangulate, based on the determined distances, a location of the first segment of the cable;

map a path of the cable from the starting segment of the cable to the location of the first segment of the cable; and provide for output a map of the path of the cable in the fiber network.

9. The system of claim 8, wherein when detecting the three or more perturbations the one or more processors are further configured to determine a respective time of arrival of the perturbation at the first segment for each of the three or more perturbations.

10. The system of claim 9, wherein when determining the distance between each of the three or more perturbations and the location of the first segment of the cable the one or more processors are further configured to determine a velocity of each of the three or more perturbations.

11. The system of claim 10, wherein the one or more processors are further configured to:

determine at the starting segment of the cable a respective time of arrival of each of the three or more perturbations;

determine a respective distance between the starting segment of the cable and each of the three or more perturbations; and determine, based on the respective time of arrival of the perturbation at the starting segment of the cable and the respective distance between the starting segment of the cable and each of the three or more perturbations, the velocity of each of the three or more perturbations.

12. The system of claim 8, wherein the starting segment of the cable is at an end segment of the cable and the first segment of the cable is adjacent to the starting segment.

13. The system of claim 8, wherein the cable includes a plurality of segments.

14. The system of claim 13, wherein the one or more processors are further configured to:

detect at each of the plurality of segments the three or more perturbations occurring at respective locations from each of the plurality of segments;

determine, based on the detected three or more perturbations, the respective distance between each of the three or more perturbations and a respective location of each the plurality of segments;

triangulate, based on the respective determined distances, the location of each of the plurality of segments; and map the path of the cable between each of the plurality of segments.

15. A non-transitory computer-readable medium storing instructions for mapping an underground cable in a fiber network, which when executed by one or more processors, cause the one or more processors to:

identify a starting segment of a cable;

detect backscattered light of pulses of light injected by a laser, wherein the backscattered light is caused by three or more perturbations at a first segment of the cable detect at the first segment of the cable the three or more perturbations occurring at respective locations from the first segment, wherein:

at least three of the three or more perturbations occur from a respective perturbation source, and the detecting comprises determining, based on backscattered light, respective strain rate signals;

determine, based on the detected three or more perturbations, the respective distance between each of the three or more perturbations and the first segment of the cable;

triangulate, based on the determined distances and the respective strain rate signals, a location of the first segment of the cable;

map a path of the cable from the starting segment of the cable to the location of the first segment of the cable; and provide for output a map of the path of the cable in the fiber network.

16. The non-transitory computer-readable medium of claim 15, wherein when detecting the three or more perturbations the one or more processors are further configured to determine a respective time of arrival of the perturbation at the first segment for each of the three or more perturbations.

17. The non-transitory computer-readable medium of claim 16, wherein when determining the distance between each of the three or more perturbations and the location of the first segment of the cable the one or more processors are further configured to determine a velocity of each of the three or more perturbations.

18. The non-transitory computer-readable medium of claim 17, wherein the one or more processors are further configured to:

determine at the starting segment of the cable a respective time of each of the three or more perturbations;

determine a respective distance between the starting segment of the cable and each of the three or more perturbations; and determine, based on the respective time or arrival of the perturbation at the starting segment of the cable and the respective distance between the starting segment of the cable and each of the three or more perturbations, the velocity of each of the three or more perturbations.

19. The non-transitory computer-readable medium of claim 15, wherein the cable includes a plurality of segments.

20. The non-transitory computer-readable medium of claim 19, wherein the one or more processors are further configured to:

detect at each of the plurality of segments the three or more perturbations occurring at respective locations from each of the plurality of segments;

determine, based on the detected three or more perturbations, the respective distance between each of the three or more perturbations and each the plurality of segments;

triangulate, based on the respective determined distances, a location of each of the plurality of segments; and map the path of the cable between each of the plurality of segments.

* * * * *